US012709439B2

(12) United States Patent
Rabiea

(10) Patent No.: US 12,709,439 B2
(45) Date of Patent: Aug. 18, 2026

(54) "DELI" BAG WITH EXTRA THIN WALLS AND INCREASED STRENGTH AND METHOD OF MANUFACTURING SAME

(71) Applicant: NEW YORK PACKAGING II LLC, New Hyde Park, NY (US)

(72) Inventor: Jeffrey Rabiea, New Hyde Park, NY (US)

(73) Assignee: New York Packaging II, New Hyde Park, NY (US)

( * ) Notice: Subject to any disclaimer, the term of this patent is extended or adjusted under 35 U.S.C. 154(b) by 0 days.

(21) Appl. No.: 14/821,229

(22) Filed: Aug. 7, 2015

(65) Prior Publication Data

US 2017/0036820 A1 Feb. 9, 2017

(51) Int. Cl.

*B65D 33/25* (2006.01)
*B31B 70/81* (2017.01)
*B31B 155/00* (2017.01)
*B31B 160/10* (2017.01)

(52) U.S. Cl.

CPC .......... *B65D 33/2541* (2013.01); *B31B 70/81* (2017.08); *B65D 33/2508* (2013.01); *B31B 2155/00* (2017.08); *B31B 2155/002* (2017.08); *B31B 2160/10* (2017.08)

(58) Field of Classification Search

CPC ............................ B31B 19/64; B65D 33/2541
USPC ...................................... 156/244.13; 493/196
See application file for complete search history.

(56) References Cited

U.S. PATENT DOCUMENTS 3,198,228 A 8/1965 Kakuji
3,338,284 A * 8/1967 Ausnit ............... B65D 33/2541 24/585.12
4,539,236 A * 9/1985 Vilutis ................ B29C 66/4312 156/198
4,767,391 A * 8/1988 Jensen .................... B31B 23/00 425/290
5,015,223 A * 5/1991 Boeckmann ............ B29C 65/18 156/581
5,816,018 A * 10/1998 Bois .......................... B65B 9/20 53/133.4

(Continued)

OTHER PUBLICATIONS

Canadian Patent Office, First Office Action for CA 2936631, Oct. 5, 2017.

(Continued)

*Primary Examiner* — Michael N Orlando
*Assistant Examiner* — John Blades
(74) *Attorney, Agent, or Firm* — Richard A. Castellano; CASTELLANO PLLC

(57) ABSTRACT

"Deli" bags are formed by extruding first and second aligned sheets of high density polyethylene film having a thickness no greater than 0.0008 inches. The aligned sheets are heat sealed along the sides and either the top or bottom edges to form each bag. After printing indicia on the wall of each bag, mating closure tracks are created. The tracks are situated proximate the non-sealed top or bottom of the bag. A closure member in the form of a slide or zipper is installed as the bags are separated and stacked. The closure member co-operates with the closure tracks to open and close the bag. Preferably, four side-by-side bags can be processed at the same time, increasing efficiency and reducing manufacturing cost. The bags have extra thin walls, increased strength and keep food fresher.

9 Claims, 3 Drawing Sheets

(56) References Cited

U.S. PATENT DOCUMENTS

| | | | | |
|---|---|---|---|---|
| 6,769,229 | B2 | 8/2004 | Kinigakais et al. | |
| 7,465,265 | B2 * | 12/2008 | Hinesley | 493/195 |
| 7,712,962 | B1 | 5/2010 | Reuhs et al. | |
| 9,050,770 | B1 * | 6/2015 | Russell | B31B 70/60 |
| 2012/0189231 | A1 | 7/2012 | Trier-Black et al. | |
| 2013/0209004 | A1 | 8/2013 | Owensby et al. | |
| 2014/0334749 | A1 | 11/2014 | Borchardt et al. | |
| 2017/0341820 | A1 * | 11/2017 | Folkmar | A23G 3/28 |

OTHER PUBLICATIONS

Canadian Patent Office, Second Office Action for CA 2936631, Jul. 5, 2018.

Fpbags.com/markets/recloseable-zipper-Ziploc-bags/, by Friesan Plastics Inc, Flexible Packaging Division.

Gtzip.com/helpfaqs.html by Zip® Brand Lock Top Plastic Bags (2014).

https://www.pal-plas.com/en/products_i_Zipper_attachment_bag_making_machine_Automatic_slider_insertion_system.html.

Islandplasticbags.com/products, published 2013 by Island Plastic Bags, Inc.

Techouse, ZipLock Sealing System, youtube.com/watch?feature=email&v=rUKG6cgu87c (2008).

Techousecorp.com.

Warehousebizongo.wordpress.com/2016/02/06/the-subtle-science-behind-designing-ziploc-bags/.

Canadian Patent Office, Issued 2936631 for CA 2936631, Jul. 21, 2020.

* cited by examiner

"DELI" BAG WITH EXTRA THIN WALLS AND INCREASED STRENGTH AND METHOD OF MANUFACTURING SAME

BACKGROUND OF THE INVENTION

1. Field of the Invention

The present Invention relates to plastic "deli" bags and more particularly to a "deli" bag formed of extra thin sheets of high density polyethylene which has increased strength and the ability to keep food products fresh longer, and to a method of manufacturing same.

2. Description of Prior Art Including Information Disclosed Under 37 CFR 1.97 and 1.98

"Deli" bags made of low density plastic sheet materials are well known in the art. The bags are used for various applications including packaging meat or other products purchased from retail food establishments. The bags are used to transport the food products to the home of the purchaser and to preserve of the contents once at home. Slide or zipper-type closures are commonly provided to seal the open mouth of the bags to preserve freshness.

Conventional "deli" bags are fabricated using a three step process in which the tracks for the slide or zipper closure are extruded as part of the plastic film by the blow film machine in the extrusion process. The bags are printed two at a time and then the slide or zipper is installed.

However, that manufacturing process is relatively slow. The time period over which the bags produced by that process can maintain freshness is limited. Further, the strength of the bags many not be adequate for all applications.

It is therefore a prime object of the present invention to provide a "deli" bag with extra thin walls and increased strength.

It is another object of the present invention to provide a "deli" bag which is capable of maintaining the freshness of its contents for a longer time period than conventional bags.

It is another object of the present invention to provide a "deli" bag formed of high density polyethylene.

It is another object of the present invention to provide a "deli" bag in which the walls of the bag are no more than 0.0008 inch thick.

It is another object of the present invention to provide a "deli" bag using a manufacturing process which is more efficient and less expensive than conventional manufacturing processes.

It is another object of the present invention to a method of manufacturing a "deli" bag in which either top loaded or bottom loaded bags can be produced.

It is another object of the present invention to provide a method of manufacturing a "deli" bag in which the closure tracks are created after the bags are formed.

It is another object of the present invention to provide a method of manufacturing a "deli" bag in which the closure tracks are created after completion of the printing process.

It is another object of the present invention to provide a method of manufacturing a "deli" bag same in which four production lines of "deli" bags can operate simultaneously.

BRIEF SUMMARY OF THE INVENTION

In general, the above object are achieved by the present invention which is directed to a method of manufacturing plastic "deli" bags including extruding first and second aligned sheets of high density polyethylene film. The sheets are formed into plastic bags films by heat sealing the aligned sheets along the sides and either the top or bottom edges of each bag. Mating closure tracks are created proximate the non-sealed top or bottom of each bag after the bag is formed. A closure member is then installed to co-operate with the closure tracks to open and close the bag.

In accordance with another aspect of the present invention, a method is provided for manufacturing plastic "deli" bags. The method includes extruding aligned sheets of plastic film each having a thickness of no more than 0.0008 inch. The bags are formed from the aligned sheets by heat sealing the side and either the top or bottom edges of each bag. Mating closure tracks are created proximate the non-sealed top or bottom of each plastic bag, after the bag is formed. A closure member is installed to co-operate with the closure tracks to open and close the bag.

The step of installing the closure member can include installing either a slider member or a zipper member.

The manufacturing method further includes printing indicia on each of the bags. Preferably, four bags in side-by-side relation are printed at the same time.

The step of extruding aligned sheets of film includes extruding a first set of aligned film sheets with a width at least as wide as two side-by-side "deli" bags. It also includes extruding a second set of aligned film sheets with the width at least as wide as two side-by-side "deli" bags. The step of printing indicia includes arranging the first set of aligned film sheets and the second set of aligned film sheets in side-by-side relation such that indicia for four "deli" bags can be printed at the same time.

In accordance with another aspect of the present invention, a plastic "deli" bag is provided including first and second aligned sheets of high density polyethylene film sealed along the sides and either the top or bottom edges. The bag has mating closure tracks proximate the non-sealed top or bottom edge thereof. A closure member is provided to co-operate with the closure tracks to permit the bag to be opened and closed.

In accordance with another aspect of the present invention, a plastic "deli" bag is provided including first and second aligned plastic sheets with a thickness of no more than 0.0008 inch sealed along the sides and either the top or bottom edges. The bag has mating closure tracks proximate the non-sealed top or bottom edge thereof. A closure member is provided to co-operate with the closure tracks to permit the bag to be opened and closed.

The bag closure member is either a slide member or a zipper member.

BRIEF DESCRIPTION OF THE SEVERAL VIEWS OF DRAWINGS

To these and to such other objects that may hereinafter appear, the present invention relates to a "deli" bag with extra thin walls and increased strength, and a method of manufacturing same, as described in detail in the following specification and recited in the annexed claims, taken together with the accompanying drawings, in which like numerals refer to like parts and in which:

DETAILED DESCRIPTION OF THE INVENTION

Figure 3:
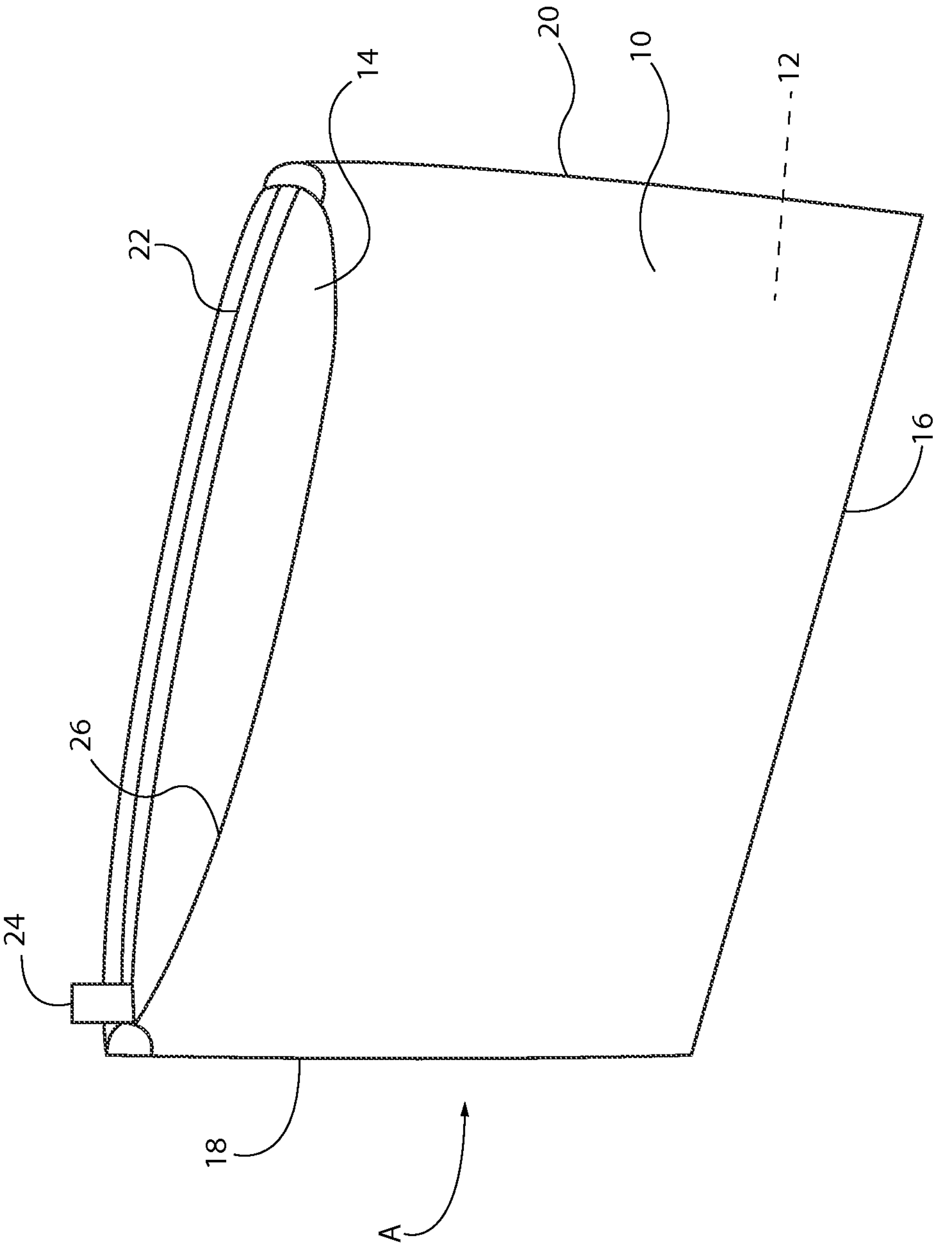
FIG. 3 is a perspective view of a bag of the present invention.

FIG. 3 shows the "deli" bag of the present invention, generally designated A. The bag includes a front wall 10, a rear wall 12, an open (non-sealed) top 14, a sealed bottom 16, a left side edge 18 and a right side edge 20. The edges 18, 20 of the front wall 10 and the rear wall 12, and bottom edge 16 are sealed to each other to form an open top enclosure adapted to receive a food product or the like.

The bag shown in FIG. 3 is loaded through the open top 14. However, bottom loading bags, in which top 14 is sealed and bottom 16 is open, can be fabricated by the process of the present invention with simple modifications well within the knowledge of those skilled in the art.

The interior surfaces of front wall 10 and rear wall 12 proximate open mouth 14 of the bag are provided with opposing, mating closure tracks 22. A closure member 24, in the form of a slide or a zipper, is installed such that movement of the member along the top of the bag will open and close mouth 14.

The walls 10 and 12 are formed of high density polyethylene, a material with a high strength-to-density ratio. It has stronger intermolecular forces and higher tensile strength as compared to low density plastic sheets. It is also harder, more opaque and can withstand higher temperatures. At the same time, the material is resistant to many solvents.

Further, the properties of high density polyethylene keep food situated within the bag fresher than conventional plastic materials. Accordingly, it is an ideal material for use in "deli" bags.

Figure 1:
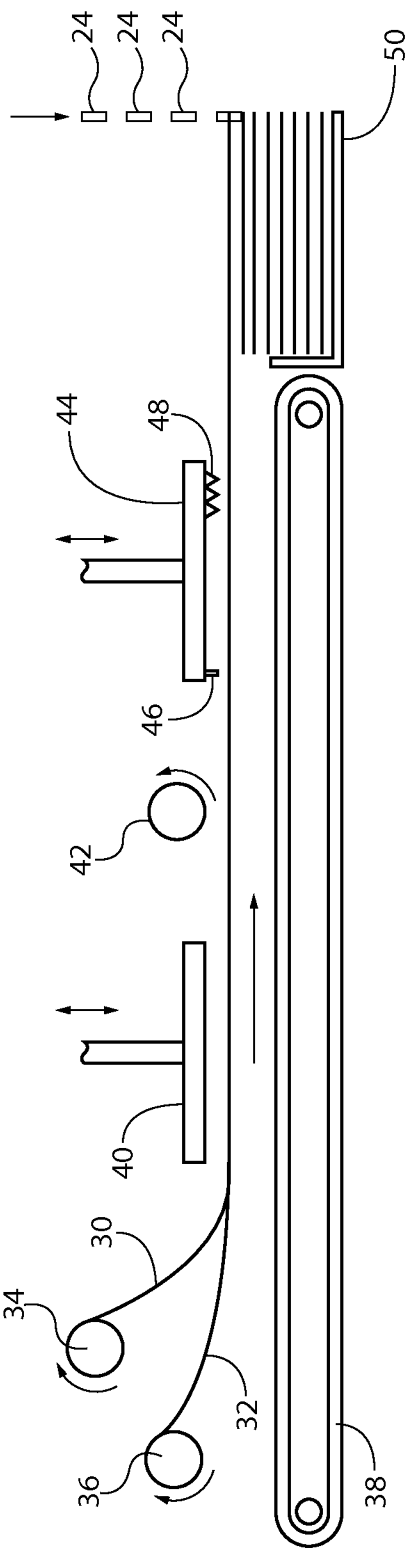
FIG. 1 is an idealized side view of a production line for manufacturing bags in accordance with the present invention.
Figure 2:
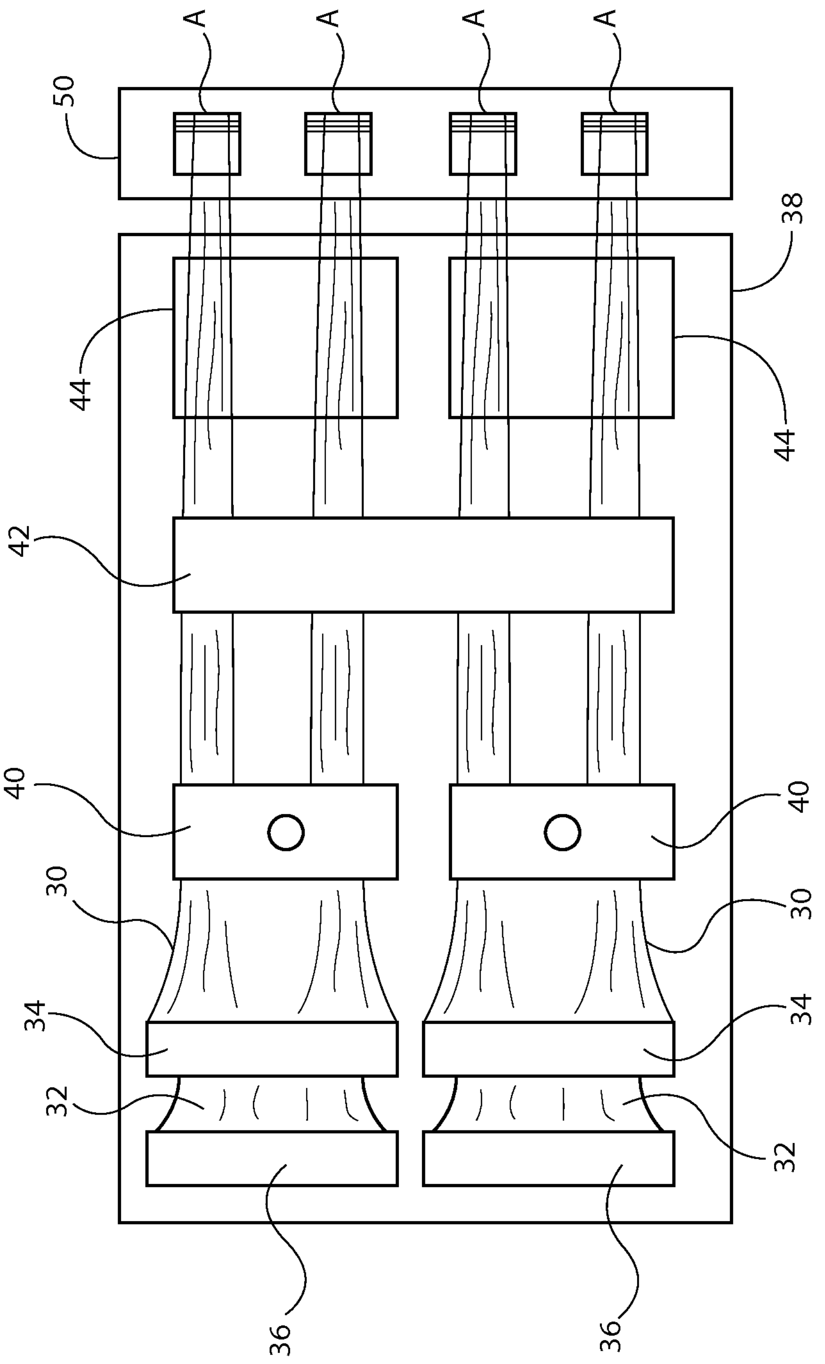
FIG. 2 is an idealized top view of the production line of FIG. 1.

FIGS. 1 and 2 illustrate the manufacturing process of the present invention. The process includes a feed stage in which first and second aligned sheets 30, 32 of extruded high density polyethylene film having a thickness of no more than 0.0008 inches are feed from rollers 34, 36 to the top surface of a conveyor 38. The closure tracks are not formed during the extrusion process, as is the case in conventional fabrication methods.

In the sealing stage, the aligned sheets 30 and 32 pass beneath a heated reciprocating platen 40 in order to form bags A. The platen heat seals the aligned sheets to join the side edges 18, 20 and bottom 16 of each bag. As these bags are top loading bags, the edges of the walls which define mouth 14 are not sealed together.

The bags then move along conveyor 38 to a print stage where they pass beneath one or more a print rollers 42 (only one of which is shown). The print rollers deposit ink in the form of text and/or images (such as the logo of the store in which the bags are used) on the exterior surface of the front wall of each bag.

After printing, the bags move through a process stage in which the bags are separated from each other by a blade and at the same time the closure tracks 22 are created. This is accomplished using a reciprocating platen 44 which includes a downwardly directed blade 46 and elongated heated protrusions 48 extending from the bottom surface. Thus, in the process of the present invention, the closure tracks are created after the bags are formed.

In the last stage of the manufacturing process, each of the separate bags A moves off the end of conveyor 38 and onto a platform 50 to form a stack of bags A. As each of the bags is situated on the stack, a closure member 24 in the form of a plastic slide or zipper is installed on the top of the bag such that the non-sealed mouth 14 of the bag can be opened and closed.

Referring now to FIG. 2, which is a top view of conveyor 38 and the associated fabrication stages, feed rolls 34 and 36 are provided in sets each feeding aligned sheets two bag widths wide to a different one of two reciprocating sealing platens 40 in the sealing station. The bags exit the sealing station in four side-by-side lines. The four lines are fed to a print roller 42. Roller 42 extends across the entire width of the conveyor such that four bags can be printed at one time. After printing, the bags pass under two platens 44 where they are separated by a blade and the closure tracks are created.

As the separated bags move off the end of conveyor 38 and onto a stack of bags accumulating on a platform 50, a closure member 24 is installed on each bag. The stacks of bags A typically contain 50 or 100 bags each and are now ready for packaging and shipment.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A method of manufacturing plastic deli bag(s), comprising:

providing a first extruded sheet to a conveyor surface, the first extruded sheet comprising a high density poyethylene film having a thickness no greater than 0.0008 inches;

providing a second extruded sheet to the conveyer the conveyer surface in alignment with the first extruded sheet;

conveying, by the conveyer surface, the first extruded sheet aligned with the second extruded sheet to a heated reciprocating platen;

heat-sealing using the heated reciprocating platen to join the first extruded sheet to the second extruded sheet at a first side edge, a second side edge, and a bottom side edge to form a bag defining a mouth at a non-sealed top side edge in communication with a bag interior;

conveying, by the conveyor surface, the formed bag from the heated reciprocating platen to a print station comprising a print roller configured to deposit ink on an exterior of a front wall of the bag to form a printed text or image;

printing on an exterior surface of the bag using the print roller;

conveying, by the conveyer surface, the formed bag from the print station to a second reciprocating platen comprising a blade and elongated heated protrusions extending toward the conveyor surface; and cutting, using the second reciprocating platen, the formed bag to separate the formed bag from an adjacent one or more bags.

2. The method of claim 1, comprising:

creating mating closure tracks disposed proximate the non-sealed top edge of the formed bag and configured for reversibly sealing the non-sealed fourth side edge of the bag.

3. The method of claim 2, comprising:

providing a closure member co-operating with the mating closure tracks for opening and closing the bag.

4. The method of claim 3, wherein the closure member is a slide member.

5. The method of claim 3 wherein the closure member is a zipper member.

6. The method of claim 1, comprising:

conveying, by the conveyor surface, the cut bag onto a platform to form a stack of bags.

7. The method of claim 1, wherein the first extruded sheet and the second extruded sheet have a width at least as wide as two side-by-side bags and constitute a first set of aligned sheets, the method comprising, arranging the first set of aligned sheets and a second set of aligned sheets in side-by-side relation whereby the printing further comprising concurrently printing on an exterior surface of a second bag formed by the second set of aligned sheets wherein three to four bags may be printed at the printing station simultaneously.

8. The method of claim 1, wherein each of the first extruded sheet and the second extruded sheet comprising a thickness no greater than 0.00010 inches.

9. The method of claim 1, wherein each of the first extruded sheet and the second extruded sheet comprising a thickness no greater than 0.00050 inches.

* * * * *